United States Patent [19]

Lown

[11] 4,233,533
[45] Nov. 11, 1980

[54] ROTOR RIM-VENTILATED GENERATOR WITH TURNING VANES FOR ROTOR INLET COOLANT GAS

[75] Inventor: Harold Lown, Schenectady, N.Y.

[73] Assignee: General Electric Company, Schenectady, N.Y.

[21] Appl. No.: 969,684

[22] Filed: Dec. 15, 1978

[51] Int. Cl.³ ............................................. H02K 9/00
[52] U.S. Cl. ........................................ 310/59; 310/53
[58] Field of Search ................... 310/157, 269, 52, 58, 310/53, 60, 55, 61, 56, 64, 57, 65

[56] References Cited

U.S. PATENT DOCUMENTS

| | | | |
|---|---|---|---|
| 2,502,669 | 4/1950 | Pollard | 310/58 |
| 3,160,770 | 12/1964 | Asantcheeff | 310/157 |
| 3,716,732 | 2/1973 | Tillma | 310/61 |
| 3,751,699 | 8/1973 | Gleichman | 310/157 |
| 4,020,373 | 4/1977 | Yamamoto | 310/61 |
| 4,061,937 | 12/1977 | Goel | 310/65 |

*Primary Examiner*—R. Skudy
*Attorney, Agent, or Firm*—Robert R. Schroeder; James C. Davis, Jr.; Paul R. Webb, II

[57] ABSTRACT

Turning, or pre-swirl, vanes are housed in stationary walled annular passages located in juxtaposition with coolant gas supply slots through which coolant gas, usually air, enters the rotor structure of a rotor rim-ventilated generator. Coolant gas flow admitted through the annular passages is turned in the direction of the rotor rotation and provided with an initial tangential velocity by the turning vanes.

7 Claims, 4 Drawing Figures

ROTOR RIM-VENTILATED GENERATOR WITH TURNING VANES FOR ROTOR INLET COOLANT GAS

BACKGROUND OF THE INVENTION

The present invention relates to improvements in the ventilation of rotor rim-ventilated generators, particularly hydrogenerators of sizes greater than about 50 Mw, although the invention is not limited thereto.

Windage losses in such generators account for approximately 30 percent of the total losses contributing to the inefficiency of the machine. By reducing the windage losses a net gain in efficiency can be realized. In addition to providing a sizable reduction in windage losses, the instant invention also enables regulation of the coolant gas flow through the machine. The invention is applicable both to self-ventilating generating units and those which require external blowers for ventilation.

BRIEF DESCRIPTION OF THE INVENTION

In this invention coolant gas flow entering the rotor structure of a rotor rim-ventilated generator first passes through stationary means for admitting the coolant gas flow and simultaneously turning this flow in the direction of the rotation of the rotor thereby providing this gas flow with an initial tangential velocity. Preferably each of the two generally planar walls of the rotor member are provided with and penetrated by an annular coolant supply slot and the admitting and turning means comprises a plurality of spaced turning vanes mounted in each of a pair of stationary walled annular passages, each of these annular passages being disposed in juxtaposition with one of the aforementioned annular coolant supply slots.

The work done by the rotor is equal to the change in angular momentum of the coolant flow as it enters and leaves the rotor. Between this entry and exit the flow passes through the rotor ventilation ducts and the interpole regions between the rotor poles. The work required of the rotor to accomplish this is reduced by the initial angular momentum provided to the coolant flow by the practice of this invention, e.g., the aforementioned turning vanes. This reduction in work required by the rotor on the coolant flow results in a reduction in windage losses and, thereby, improves the efficiency of the generator unit. Such turning vanes also act as pressure-dissipating, or throttling, elements and by proper selection of the spacing of, and the degree of turning of the flow by, the turning vanes, a preselected control can be imposed upon the amount of coolant flow supplied to the machine.

BRIEF DESCRIPTION OF THE DRAWINGS

The subject matter of the instant invention for which protection is sought is presented as claims at the conclusion of the written description of the invention as set forth herein. The following portion of the description sets forth the manner and process of making and using the invention and the accompanying drawings form part of the description for the schematic illustration thereof.

MANNER AND PROCESS OF MAKING AND USING THE INVENTION

Figure 1:
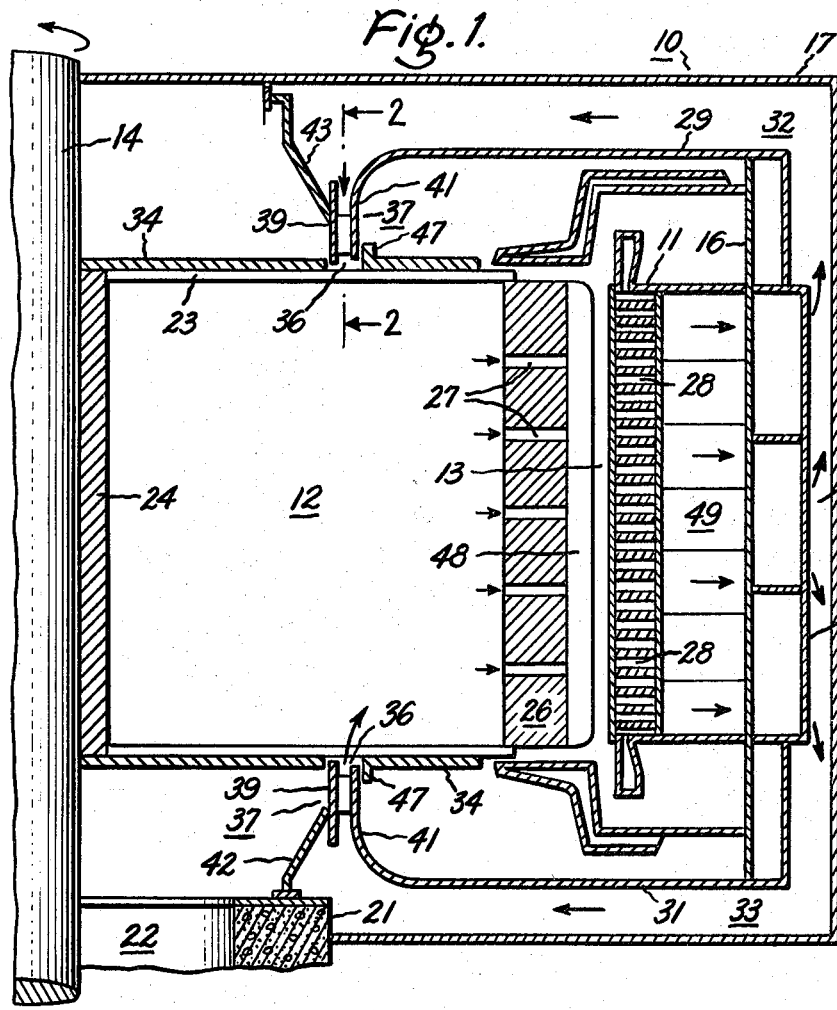
FIG. 1 shows a radial section of a rotor rim-ventilated generator provided with one embodiment of the invention.

FIG. 1 displays a radial section through a rotor rim-ventilated generator (e.g., typically a hydrogenerator) 10 comprising a stator structure 11 surrounding a rotor structure 12, which form an air gap 13 therebetween. Rotor member 12 is suitably attached to rotatable shaft 14 and stator member 11 is attached to the stator frame 16 disposed within housing structure 17 so as to define passageway 18 between coolers 19 and housing structure 17. The overall structure of machine 10 is supported by foundation 21 surrounding pit 22 wherein a structure (e.g., a water turbine, not shown) is suitably located to provide the drive for rotor 12 via shaft 14.

Rotor 12 includes a structural framework in the form of rotor spider structure 23 extending between hub 24 and rim 26 and being suitably attached to these members. Hub member 24 is keyed, or otherwise suitably engaged, to shaft 14. Rim member 26 and stator 11 have ventilation ducts 27 and 28, respectively, extending therethrough in the conventional manner.

Machine 10 is provided with internally located partitions 29,31 defining the requisite return flow ducts 32 and 33, respectively, by which flow is directed from coolers 19 to the rotor as will be described hereinbelow. As is shown in FIG. 1, spider structure 23 is enclosed by cover plates 34 so as to completely cover the rotor except for annular coolant supply slots 36 defined thereby through which coolant gas flow will enter rotor 12 between the spider members.

Figure 2:
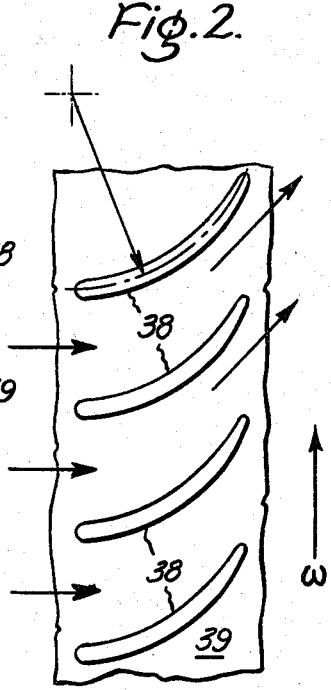
FIG. 2 is a sectional view through one embodiment of the turning, or pre-swirl, vanes taken on line 2—2.
Figure 3:
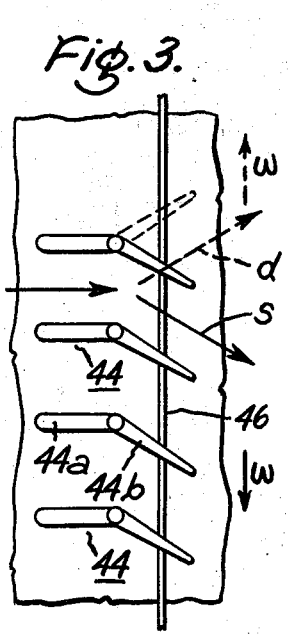
FIG. 3 is a sectional view taken through a second embodiment of turning vanes according to this invention taken on line 2—2.

The improvement of this invention by which sizable (e.g., about 20 percent) reduction in windage losses can be realized is shown in FIGS. 1, 2 and 3, the preferred embodiment being shown in FIG. 2. Thus, substantially all of the incoming coolant flow to enter annular slots 36 must first negotiate the flow admitting and turning means 37, one of which is disposed in juxtaposition with each of the two annular slots 36,36. Each flow admitting and turning means 37 comprises a plurality of spaced turning, or pre-swirl, vanes 38 mounted between spaced walls 39,41. Each set of walls 39,41 defines therebetween a stationary annular passage located in juxtaposition with a coolant supply slot 36. In the arrangement shown, means 37 disposed at the underside of rotor 12 is supported on foundation 21 by means of struts 42 while means 37 disposed above rotor 12 depends via strut 43 from the upper wall of housing 17. Each value 38 is of a configuration and orientation to effectuate a change in the direction of the incoming flow as it leaves vanes 38 within rotor 12 such that this coolant gas will be moving in the general direction of rotor rotation. In the preferred embodiment the chamber of each vane 38 is in the form of a constant circular arc and, whatever camber is selected, it should be able to effectuate turning of the gas flow by an amount in the range of from about 45° to about 50° from the axial direction. The location of the slot 36/admitting and turning means 37 combinations are located at a radius of at least about 30 percent of the rotor radius and preferably, as close as they may be conveniently located adjacent to the inlets to the rotor rim ventilating ducts 27.

In those instances in which the rotor and the drive therefor may be reversed, the turning vanes are constructed to accommodate such reversal as, for example, is shown in FIG. 3, a sectional view similar to FIG. 2. Turning vanes 44 are constructed with a stationary portion 44a and a movable portion 44b pivotally mounted thereabout for disposition in either of the positions shown (solid line and dotted line designations) by movement of annular actuator rod 46. The effect of adjusting movable portions 44b in each of the positions shown in imparting the requisite tangential velocity to the gas flow is designated by means of solid arrow s and dotted arrow d.

Annular radial seals 47 are provided adjacent wall 41 to prevent coolant gas flow from avoiding the annular passage/turning vane structure and entering directly into rotor 12 via slots 36, or at least to greatly reduce such short-circuiting.

Once coolant flow has been admitted to rotor 12 with the desired tangential velocity imparted thereto by the pre-swirl vanes in turning the coolant flow in the direction of rotor rotation, this flow moves radially outward. Thereafter the flow enters and travels through the rotor ventilation ducts 27 to remove heat from the rotor field windings (not shown) on salient pole pieces 48 supported on rim 26 as this flow passes through the interpole regions; exits from rotor rim 26 and then traverses stator ventilation ducts 28 to remove heat from the stator windings. The gas flow exiting the stator 11 passes through the stator discharge annulus 49 after which heat is removed therefrom in coolers 19. The flow so cooled returns to coolant flow inlet slots 36 via either the path comprising annular passage 18, volume 32 and the upper admitting and turning means 37 or the path comprising annular passage 18, volume 33 and the lower admitting and turning means 37.

Figure 4:
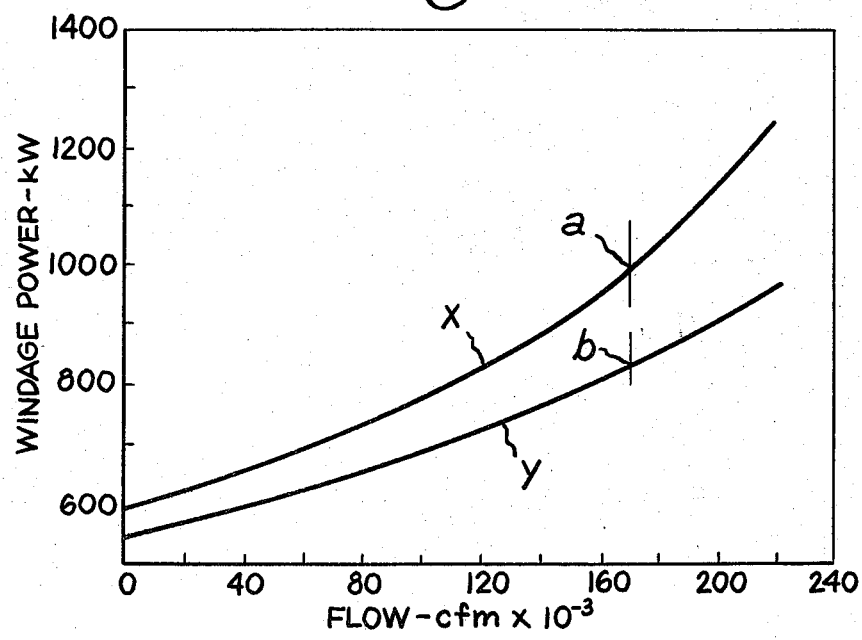
FIG. 4 is a graphic representation of tests establishing that use of the turning vanes according to this invention provides a sizable reduction in windage losses.

Test results using the pre-swirl vane coolant gas entry of the instant invention have shown that the use of such vanes effectuates a sizable reduction in windage losses and also facilitates regulation of the flow. An indication of the extent of reduction of windage loss is demonstrated in FIG. 4. Curves x and y represent the windage power expended plotted as a function of coolant gas flow for a generator before and after, respectively, being equipped with the pre-swirl vanes of this invention. At rated flow for the given machine, ordinate a,b representing a reduction of about 160 kW indicates a reduction in windage loss of about 16 percent.

BEST MODE CONTEMPLATED

Turning vanes having constant circular arc camber and radially disposed as close as physically possible to the inlet to the rotor rim ventilation ducts comprise the best mode. The particular spacing and construction of the turning vanes employed as well as the radial location and the amount of turning of the coolant gas flow to be effectuated will, of course, vary with the particular rim-ventilated generator mechanical design and its cooling flow requirements. Thus, within these constraints, the best mode contemplated has been disclosed hereinabove.

Thus, for example, in the case of a rotor rim-ventilated pumped storage hydrogenerator, duo-directional rotation of the rotor is required and an adjustable vane arrangement as generally described in FIG. 3 would be employed. The particular manner of accomplishing reversal of the vane setting is considered an obvious expedient and, as noted above, selection of the extent of flow turning as well as the amount of throttling to be effected by the vanes is within the skill of the art with the disclosure hereinabove as guidance.

What I declare as new and desire to secure by Letters Patent of the United States is:

1. A rotor rim-ventilated generator having a stator member, a rotor member concentric therewith and a gap between said rotor and stator members, means connected to said rotor member for driving said rotor member, said stator member having windings thereon and said stator member and the rim of said rotor member each having ventilation ducts extending therethrough in the generally radial direction for the passage of cooling gas, the improvement comprising means effective during operation for simultaneously admitting coolant gas flow to said rotor member and turning said gas flow in the direction of rotor rotation, said admitting and turning means being stationary and being disposed adjacent each of the two generally planar walls of said rotor member radially inward of said rotor rim in flow communication with the radially inner end of the rotor rim ventilation ducts.

2. The improvement in rotor rim-ventilated generators recited in claim 1 wherein the admitting and turning means comprise a plurality of spaced turning vanes mounted in each of a pair of stationary walled annular passages for turning said gas flow in a direction of rotor rotation, each of said annular passages being disposed in juxtaposition with one of a pair of annular coolant supply slots, one of said annular slots being located along and penetrating each of the two generally planar walls of the rotor member.

3. The improvement in rotor rim-ventilated generators recited in claim 2 wherein the camber of each vane is in the form of a constant circular arc.

4. The improvement in rotor rim-ventilated generators recited in claim 2 wherein each of said vanes is directionally reversible to accommodate changes in the sense of rotation of the rotor member.

5. The improvement in rotor rim-ventilated generators recited in claim 2 wherein sealing means are provided at the coolant supply slots to prevent the coolant gas flow from entering the rotor without encountering the vanes.

6. The improvement in rotor rim-ventilated generators recited in claim 2 wherein the turning vanes and the coolant supply slots are located at a radius of at least about 30 percent of the rotor radius.

7. The improvement in rotor rim-ventilated generators recited in claim 2 wherein the coolant gas flow entering the rotor member is turned by an amount in the range of from about 45° to about 50° from the axial direction.

* * * * *